L. R. ZIFFERER.
ADJUSTABLE PIPE HANGER.
APPLICATION FILED JULY 26, 1919.
1,392,810.
Patented Oct. 4, 1921.
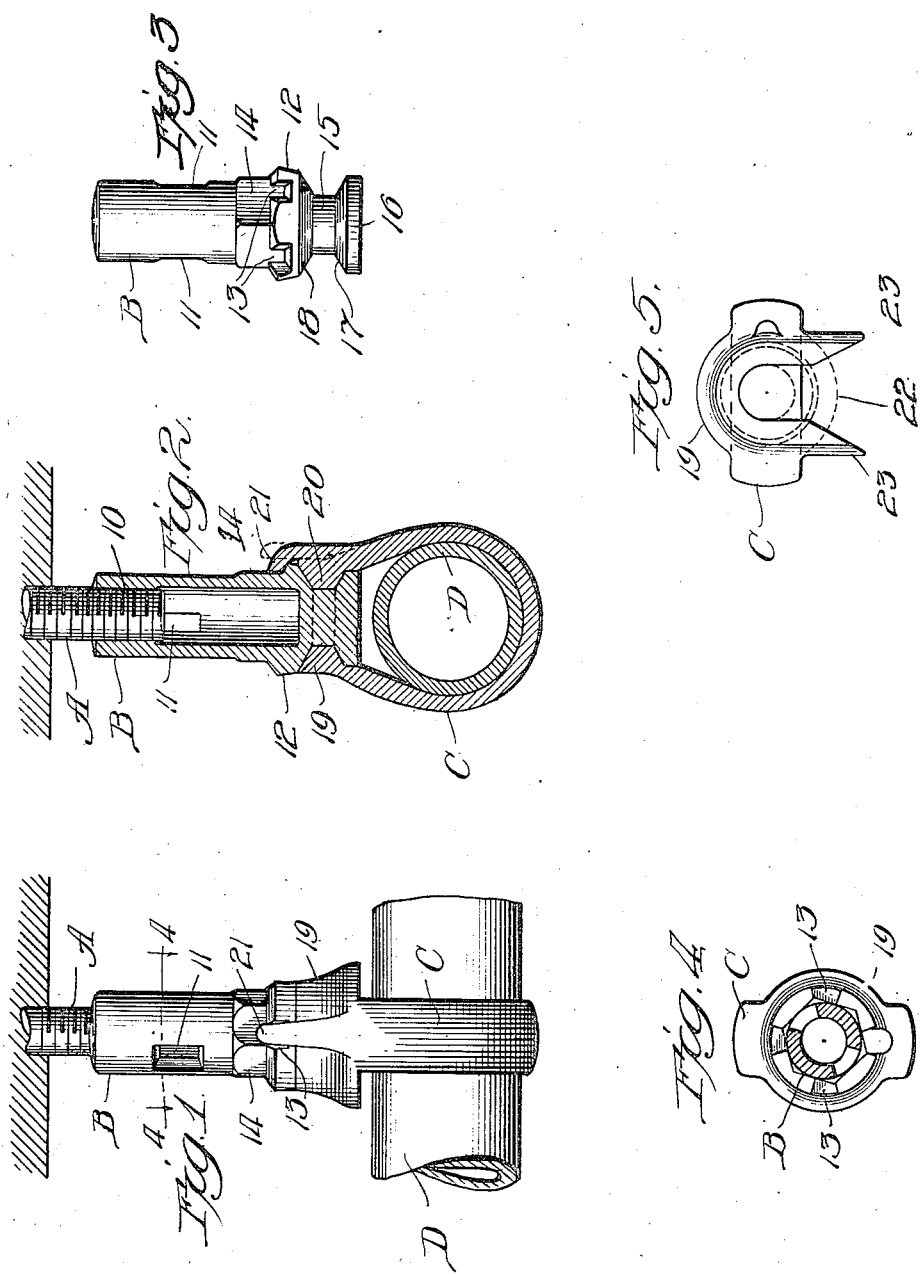
Witness:
Harry S. Gaither
Inventor:
Lothar R. Zifferer
by [Attorneys]

UNITED STATES PATENT OFFICE.

LOTHAR R. ZIFFERER, OF LANCASTER, PENNSYLVANIA.

ADJUSTABLE PIPE-HANGER.

1,392,810.   Specification of Letters Patent.   Patented Oct. 4, 1921.

Application filed July 26, 1919. Serial No. 313,446.

*To all whom it may concern:*

Be it known that I, LOTHAR R. ZIFFERER, a citizen of the United States, residing at Lancaster, in the county of Lancaster and State of Pennsylvania, have invented certain new and useful Improvements in Adjustable Pipe-Hangers, of which the following is a specification.

This invention relates generally to a means of support such, for instance, as is particularly adapted for the suspension of overhead pipe lines of the kind commonly used in sprinkler systems for fire extinguishing purposes; more particularly it is concerned with certain improvements in a device of the hanger type that is adjustable toward and from the wall, ceiling, or other fixed support to which it is attached.

The objects of this invention, briefly summarized, are to provide a hanger for the purposes mentioned, (1) that may be produced and installed at small expense, (2) that will remain in a fixed position of adjustment, and (3) that will afford a visual indication of the extent of its adjustment. Other objects, however, are also contemplated, as will more fully hereinafter appear from the specification and claims.

An embodiment of this invention in a desirable form is illustrated in the accompanying drawing wherein—

Figure 1 is a side elevation of the hanger showing its relation to the bolt to which it is attached and to a pipe which it is designed to carry;

Fig. 2 is a longitudinal section therethrough taken in a plane transverse to that of Fig. 1;

Fig. 3 is an elevation of the sleeve detached from the carrier;

Fig. 4 is a cross section taken on line 4—4 of Fig. 1; and

Fig. 5 is a plan view of a modified form of carrier as it would appear when detached from the sleeve.

It may be mentioned at the outset that the device of this invention is adapted for threaded connection with a bolt A which may be secured to a wall, ceiling, or other fixed structure by any appropriate means. The hanger itself consists of but two parts, one being a sleeve B having a rotatable connection with a carrier C which may have the general characteristics of an eye adapted to receive a pipe D.

The sleeve portion of this device, illustrated in detached relation in Fig. 3, is provided as at 10 with internal threads adapted to coöperate with the threads of the bolt A. Openings 11 may be arranged upon diametrically opposite sides of the sleeve, these being preferably elongated in the direction of the sleeve axis, so as to afford a view interiorly of the sleeve, whereby the extent to which it has been threaded upon the bolt may be readily determined. Near the end of the sleeve where connection is made with the carrier C, a formation 12 having the characteristics of an annular shoulder is provided, which, in the form shown, is notched or recessed at intervals as at 13. Adjacent this shoulder portion the sides of the sleeve may take on a polygonal formation, as at 14, to provide a wrench hold.

The end of the sleeve where connection is made with the carrier is formed to provide a neck 15 which terminates in an enlarged head 16. Oblique faces 17 and 18 are formed, respectively, upon the head 16 and shoulder 12 in adjacent relation to the neck 15 so as to provide, in effect, a peripheral channel with divergent side walls. The carrier C which, as already stated, is in the general form of an eye, is provided with a collar 19 having an inwardly projecting circular flange 20 with oblique sides, the flange being adapted to surround the neck 15 with its oblique sides in adjacent relation to the surfaces 17 and 18. In this manner a swiveled connection between the sleeve B and carrier C is provided. Extending from one side of the collar 19 to a point above the shoulder 12 is a lug 21 which, when desired, may be bent into engaging relation within one of the notches 13 so as to prevent relative rotation between the carrier and the sleeve. The initial position of this lug, prior to bending, is shown by the dotted lines in Fig. 2.

In Fig. 5 I have exhibited a slightly modified construction, the collar 19 being formed with an open slot on one side, as at 22, to permit of its assembly upon the sleeve by a lateral movement. The portions of the collar adjacent the slot constitute tongues 23 which may be bent toward each other to encircle the neck of the sleeve, and thereby provide an inseparable connection thereupon. In all other respects the structure of Fig. 5 may follow the form elsewhere shown and described.

Installation of the present hangers may be effected after the fastening devices, such as bolts A, are secured to the ceilings or other support. The sleeve of each hanger is then turned upon its supporting bolt to adjust the device to the required height, the carrier during this operation remaining stationary and unaffected except as to variations in its height. The extent to which the sleeve is threaded upon the bolt may be visually determined by looking through one of the apertures 11. This is of great advantage since the supporting bolts A do not generally project for equal distances from the wall or ceiling to which they are secured, and there is no way of determining how far each hanger may be threaded in place other than by an inspection through the openings 11. After each hanger has been adjusted to the required point in its relation to the pipe line, the several lugs 21 are then tapped with a hammer or other instrument by which action they are bent into the notches 17. After this operation, it will be impossible to further vary the adjustment of the hangers relative to their supporting bolts.

The present device is particularly advantageous in that it is compact, always maintained in unitary relation, and positive in its lock against change of adjustment when once set. It is furthermore inexpensive to manufacture, affords a very strong support for the load that it is designed to carry, and permits those attending to installation to know definitely to what extent each device has been threaded upon its attaching bolt. The eye of the carrier furthermore, which is designed to receive the pipe or other load, may be shaped properly to hold the same immovably, and is itself rigidly related to the hanger parts, so that the position of the load cannot change. Changes or modifications in the exact form shown are, of course, clearly possible, but where the construction embodies the principles of this invention as defined in the claims below, it is to be deemed as within the scope of this patent.

I claim:

1. In a pipe hanger, the combination of a carrier having upon one of its walls a collar through which is formed an opening extending through said wall, a sleeve arranged to present one of its ends through the collar opening of the carrier, a head and a shoulder on the sleeve in spaced relation each formed to overlie an opposite end of the collar to connect the sleeve to the carrier inseparably, the shoulder being provided with a notch, and a bendable lug extending from the collar to a position adjacent the notch so as to lie therein, when bent, to prevent relative rotation between the sleeve and carrier, substantially as described.

2. In a pipe hanger, the combination of a carrier in the form of an eye having upon one side thereof a collar through which is formed an opening communicating with the eye, an internally threaded sleeve having one end entered through the collar opening in the carrier and provided with a head on its extremity adapted to overlie the inner end of the collar to prevent separation of the sleeve from the carrier, a shoulder on the sleeve in overlying relation to the outer end of the collar to prevent the sleeve from moving endwise of itself relative to the carrier, and means on the sleeve together with other means on the carrier adapted for relative movement to lock the sleeve and carrier against rotary movement, substantially as described.

3. In a pipe hanger, the combination of a threaded sleeve, a carrier rotatably connected thereto, and an element integral with the one part adapted when bent into locking engagement with the other part to prevent relative rotation as well as longitudinal shifting therebetween, substantially as described.

4. In a pipe hanger, the combination of two parts, one in the form of a sleeve having a head at one of its ends, and the other in the form of a carrier in whose walls is provided an opening through which the sleeve is entered, the head acting to limit endwise movement of the sleeve therein, and an element carried by the one part adapted when moved toward the other part to prevent rotation as well as longitudinal shifting of the sleeve relative to the carrier, substantially as described.

5. In a device of the kind described, the combination of a sleeve having at one end thereof a neck of reduced diameter, a carrier formed with a collar in encircling relation to the neck whereby the collar may be rotated relative to the sleeve, the sleeve and collar coöperating to prevent movement in any other direction, and means for locking the sleeve and collar to prevent relative movement therebetween, substantially as described.

LOTHAR R. ZIFFERER.

Witness:
EPHRAIM BANNING.